United States Patent [19]

Okamoto

[11] Patent Number: 5,099,684

[45] Date of Patent: Mar. 31, 1992

[54] METHOD AND DEVICE FOR SETTING A DISTANCE BETWEEN RIMS IN TIRE UNIFORMITY MACHINE

[75] Inventor: Masayoshi Okamoto, Kakogawa, Japan

[73] Assignee: Kabushiki Kaisha Kobe Seiko Sho, Kobe, Japan

[21] Appl. No.: 665,690

[22] Filed: Mar. 7, 1991

[30] Foreign Application Priority Data

Mar. 7, 1990 [JP] Japan ................... 2-55844

[51] Int. Cl.$^5$ ............................................. G01M 17/02
[52] U.S. Cl. ............................................. 73/146; 73/8
[58] Field of Search ................. 73/146, 8; 29/864, 351

[56] References Cited

U.S. PATENT DOCUMENTS

| | | | |
|---|---|---|---|
| 3,593,764 | 7/1971 | Smith | 144/288 A |
| 3,948,094 | 4/1976 | Honlinger | 73/146 |
| 4,023,407 | 5/1977 | Vanderzee | 73/146 |
| 4,380,927 | 4/1983 | Oda et al. | 73/146 |
| 4,574,628 | 3/1986 | Maikuma et al. | 73/146 |
| 4,971,128 | 11/1990 | Koga et al. | 73/146 |

FOREIGN PATENT DOCUMENTS

0138471 4/1985 European Pat. Off. .
1-155234 6/1989 Japan .
1-08827 9/1989 PCT Int'l Appl. .

*Primary Examiner*—Donald O. Woodel
*Attorney, Agent, or Firm*—Oblon, Spivak, McClelland, Maier & Neustadt

[57] ABSTRACT

A method of setting a distance between upper and lower rims mounted on upper and lower spindles in a tire uniformity machine. The upper and lower rims under a superposed condition are first laid on an arm. Then, the arm is lifted or lowered until the upper rim reaches a desired upper position on the upper spindle. Then, the upper rim is fixed from an inner circumference thereof to the upper spindle at the desired upper position by an upper locking device. Then, the arm is lowered until the lower rim reaches a desired lower position on the lower spindle. Then, the lower rim is fixed from an inner circumference thereof to the lower spindle at the desired lower position by a lower locking device. Accordingly, a distance between the upper and lower rims can be set easily and quickly in a simple operation without using a spacer or the like.

2 Claims, 7 Drawing Sheets

METHOD AND DEVICE FOR SETTING A DISTANCE BETWEEN RIMS IN TIRE UNIFORMITY MACHINE

BACKGROUND OF THE INVENTION

The present invention relates to a method and device for setting a distance between rims in a tire uniformity machine.

In a tire uniformity machine, a tire is mounted through upper and lower rims between upper and lower spindles, and the tire is rotated about an axis of the upper and lower rims aligned to each other, so a to carry out measurement by pressing a loadwheel against the tire.

In the case that another tire having a size different from that of the tire mounted on the upper and lower rims is intended to be mounted on the upper and lower rims, it is necessary to set a distance between the upper and lower rims again in accordance with the different tire.

To automate such a setting operation, there has been proposed in Japanese Patent Laid-open Publication No. 1-155234 that a rim exchanging carriage is used to automatically change the distance between the upper and lower rims.

However, in the prior art device, when the distance between the upper and lower rims is changed, a thickness of a spacer is changed according to the distance, and the upper and lower rims are then fixed to the upper and lower spindles. Therefore, it is necessary to remove the spacers from the upper and lower spindles for the exchange of the spacers. Thus, although the operation is automatic, the procedure of the operation is very complicated to require much time.

SUMMARY OF THE INVENTION

It is accordingly an object of the present invention to provide a setting method and device which can set a distance between the upper and lower rims easily and quickly in a simple operation without using the spacer or the like.

According to the present invention, there is provided in a tire uniformity machine including upper and lower spindles between which a tire is mounted through upper and lower rims; a method of setting a distance between said upper and lower rims, comprising the steps of laying said upper and lower rims under a superposed condition on an arm, lifting or lowering said arm until said upper rim reaches a desired upper position on said upper spindle, fixing said upper rim from an inner circumference thereof to said upper spindle at said desired upper position by upper locking means, lowering said arm until said lower rim reaches a desired lower position on said lower spindle, and fixing said lower rim from an inner circumference thereof to said lower spindle at said desired lower position by lower locking means.

According to the present invention, there is also provided in a tire uniformity machine including upper and lower spindles between which a tire is mounted through upper and lower rims; a device for setting a distance between said upper and lower rims, comprising upper and lower locking means for locking said upper and lower rims from inner circumferences thereof to said upper and lower spindles at upper and lower arbitrary positions, respectively, an arm for supporting said upper and lower rims under a superposed condition, said arm being adapted to be advanced toward and retracted away from said upper and lower spindles and also adapted to be lifted and lowered in parallel to axes of said upper and lower spindles, a driving mechanism for advancing and retracting said arm, and a lifting mechanism for lifting and lowering said arm.

In setting a distance between the upper and lower rims, the upper and lower locking means are operated to unlock the upper and lower rims fixed to the upper and lower spindles and lay the upper and lower rims under a superposed condition on the arm. Then, the arm is lifted or lowered until the upper rim reaches a desired position on the upper spindle. Then, the upper rim is locked from its inner circumferential side to the upper spindle by the upper locking means. Then, the arm is lowered until the lower rim reaches a desired position on the lower spindle. Then, the lower rim is locked from its inner circumferential side to the lower spindle by the lower locking means. Thus, the distance between the upper and lower rims is set to a desired value. Thereafter, the arm is retracted away from the upper and lower spindles. In this manner, the distance between the upper and lower rims can be set easily and quickly in a simple operation. Furthermore, the distance can be set to an arbitrary distance.

Other objects and features of the invention will be more fully understood from the following detailed description and appended claims when taken with the accompanying drawings.

DETAILED DESCRIPTION OF THE PREFERRED EMBODIMENTS

There will now be described a preferred embodiment of the present invention with reference to the drawings.

Figure 1:
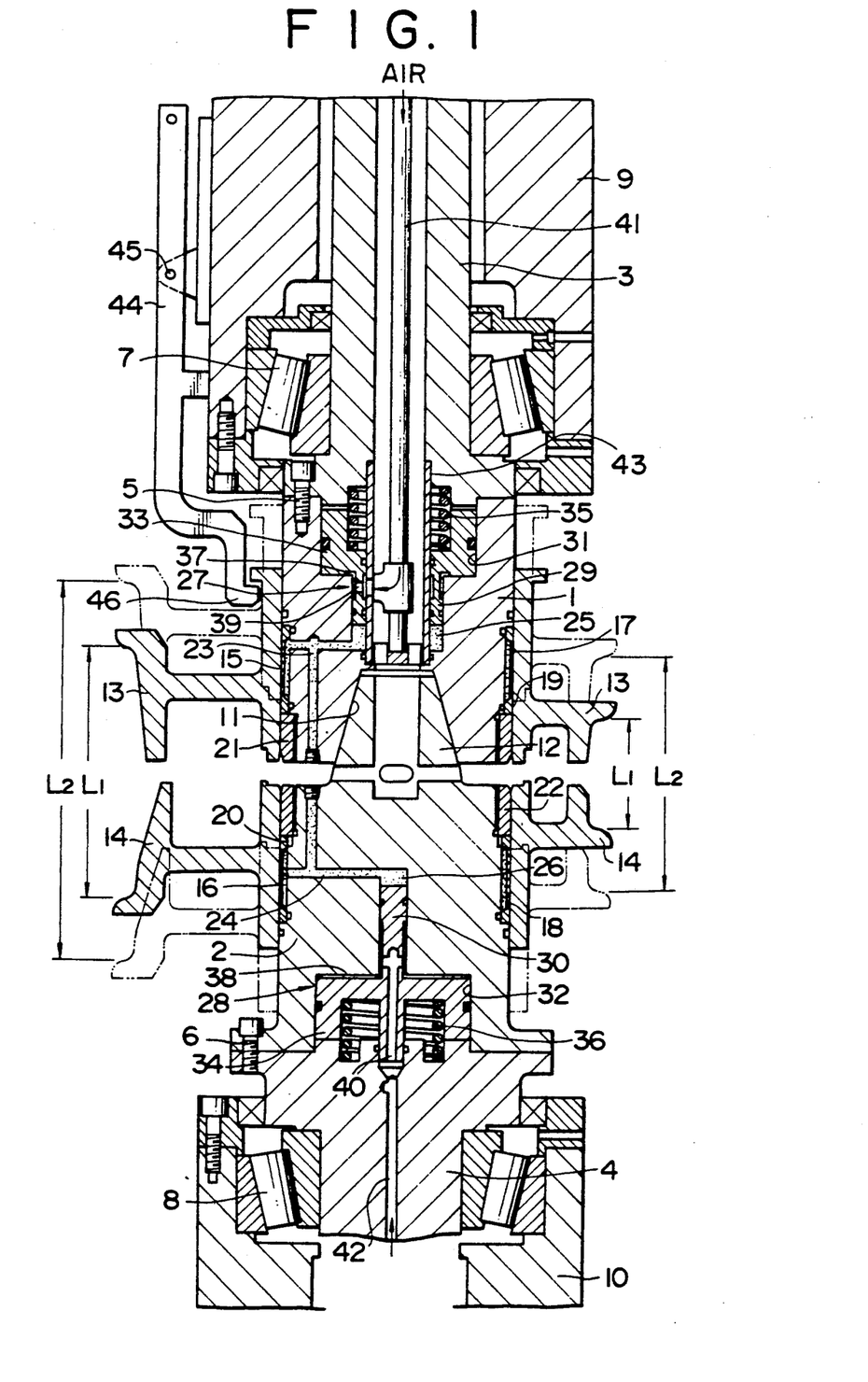
FIG. 1 is a vertical sectional view of a spindle portion in a preferred embodiment of the present invention.

Referring to FIG. 1, reference numerals 1 and 2 designate an upper spindle and a lower spindle, respectively. The upper and lower spindles 1 and 2 are mounted on opposed end surfaces of upper and lower support shafts 3 and 4 by means of bolts 5 and 6, respectively, so as to be disposed in coaxial and opposed relationship to each other in a vertical direction. The upper and lower support shafts 3 and 4 are rotatably supported through bearings 7 and 8 to bearing cases 9 and 10, respectively. The upper support shaft 3 is rotatably driven about its axis by a drive motor (not shown), and the lower support shaft 4 is vertically movably supported together with the bearing case 10 by lifting means (not shown). The upper spindle 1 is formed at its lower end with a tapering recess 11, and the lower spindle 2 is formed at its upper end with a tapering projection 12, so that when the lower spindle 2 is lifted, the tapering projection 12 is brought into engagement with the tapering recess 11, thus connecting both the spindles 1 and 2 together.

Reference numerals 13 and 14 designate an upper rim and a lower rim, respectively. The upper and lower rims 13 and 14 are adapted to be vertically slidably and disengageably engaged with outer circumferential surfaces of the upper and lower spindles 1 and 2. respectively, and are also adapted to be locked from their inner circumferential surfaces at arbitrary positions by hydraulic upper and lower locking means 15 and 16, respectively. In FIG. 1, right and left portions of each of the upper and lower rims 13 and 14 are shown to have different shapes, and a vertical position of each of the rims 13 and 14 can be changed between a solid line position and a dashed line position. Accordingly, a distance between the upper and lower rims 13 and 14 can be set to an arbitrary value in the range between $L_1$ and $L_2$.

The upper and lower locking means 15 and 16 are constructed of expandable rings 19 and 20 and oil chambers 17 and 18 defined inside the expandable rins 19 and 20, respectively. The expandable rings 19 and 20 are engaged with the upper and lower spindles 1 and 2, and are fixed by nuts 21 and 22, respectivley. The oil chambers 17 and 18 are communicated through oil passages 23 and 24 to oil chambers 25 and 26 defined at central portions of the upper and lower spindles 1 and 2, respective. Rams 29 and 30 of air cylinders 27 and 28 are provided in the oil chambers 25 and 26, respectively. The air cylinders 27 and 28 are constructed of cylinder chambers 31 and 32 defined in the upper and lower spindles 1 and 2, pistons 33 and 34 slidably engaged in the cylinder chambers 31 and 32, and the rams 29 and 30 integrally formed with the pistons 33 and 34, respectivley. The pistons 33 and 34 are biased by springs 35 and 36 so as to pressurize oil in the oil chambers 25 and 26 by means of the rams 29 and 30, respectively. Further, air chambers 37 and 38 are defined so as to apply air pressure to the pistons 33 and 34 against a biasing force of the springs 35 and 36, respectively. The air chambers 37 and 38 are connected from passages 39 and 40 formed in the rams 29 and 30 through a pipe 41 and a passage 42 to an air source (not shown), respectively. Accordingly, when air pressure in the air chambers 37 and 38 of the air cylinders 27 and 28 is relieved, the pistons 33 and 34 and the rams 29 and 30 are urged by the springs 35 and 36 to pressurize the oil in the oil chambers 25 and 26, respectively. As a result, the pressure in the oil chambers 17 and 18 is increased to radially outwardly expand the expandable rings 19 and 20 and thereby lock the upper and lower rims 13 and 14 from the inner circumferential surfaces thereof, respectively. The ram 29 is slidably engaged with an outer circumference of a sleeve 43.

Reference numeral 44 designates a stopper arm. The stopper arm 44 is pivotably supported through a pin 45 to the bearing case 9. The stopper arm 44 is formed at its lower end with an engaging portion 46 adapted to disengagebly engage a flange portion of the upper rim 13. Further, a pivotal operation means (not shown) for pivotably operating the stopper arm 44 is connected to an upper end of the stopper arm 44.

Figure 2:
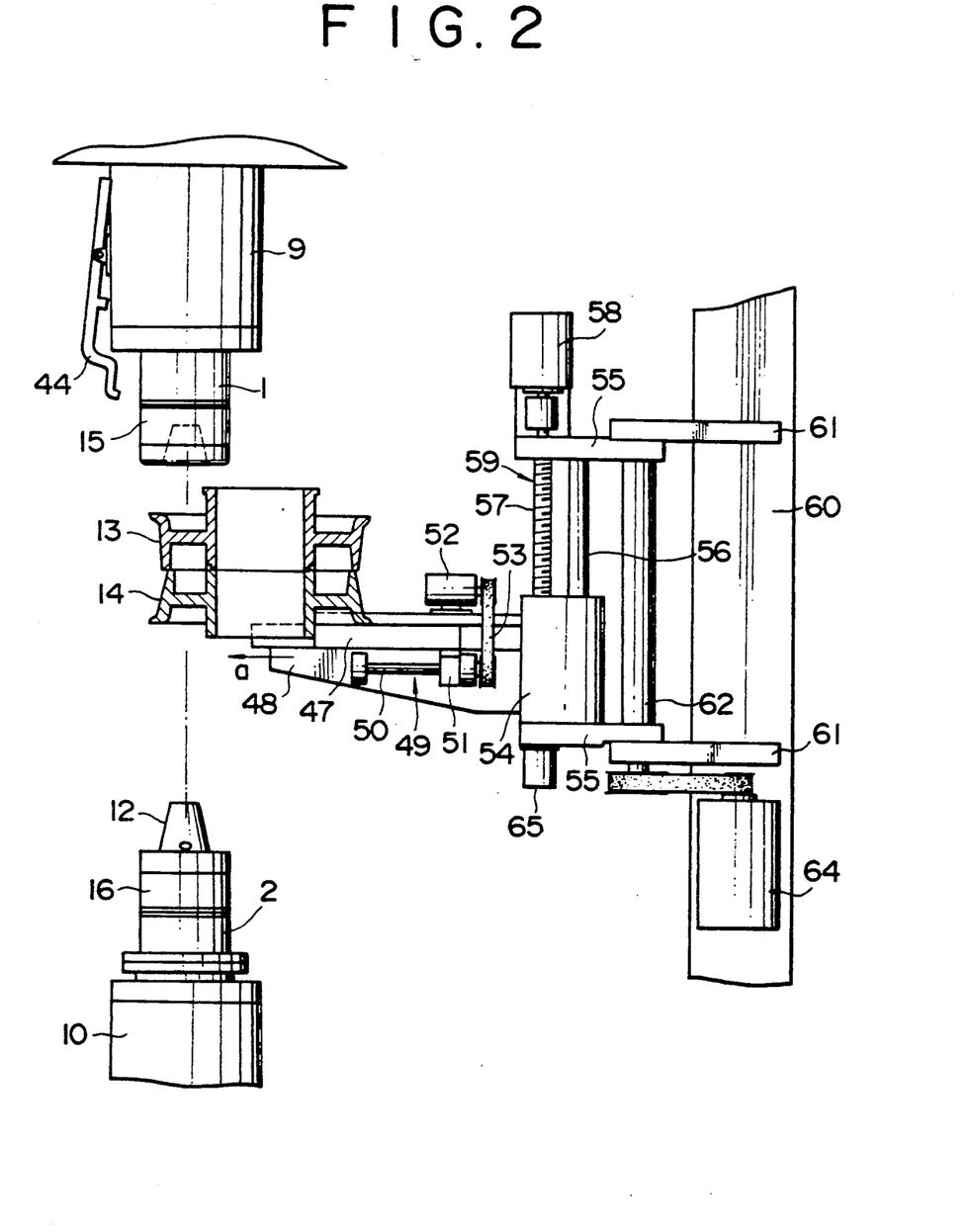
FIG. 2 is an elevational view of the setting device according to the present invention.

Referring to FIG. 2, reference numeral 47 designates a forked arm having a front end portion on which the upper and lower rims 13 and 14 under a superposed condition are adapted to be laid. The forked arm 47 is movably mounted on a support frame 48 so as to be advanced toward and retracted away from the upper and lower spindles 1 and 2 by a driving mechanism 49. The driving mechanism 49 includes a screw shaft 50 rotatably mounted to the support frame 48 and threadedly engaged with a nut 51 of the arm 47, and a motor 52 mounted on the support frame 48 for reversibly driving the screw shaft 50 through a belt 53 to rotate the screw shaft 50 in normal and reverse directions.

The support frame 48 is fixed to a lift block 54. The lift block 54 is vertically movably supported to a guide rod 56 and a screw shaft 57 extending between upper and lower slewing frames 55 so as to be lifted and lowered in parallel to the upper and lower spindles 1 and 2. The screw shaft 57 is reversibly rotated by a motor 58. Thus, the screw shaft 57 and the motor 58 constitute a lifting mechanism 59. The upper and lower slewing frames 55 are supported through a slewing shaft 62 to upper and lower bracket 61 of a fixed frame 60. The slewing shaft 62 is rotatably connected through a belt 63 to a motor 64 mounted on the fixed frame 60. Reference numeral 65 designates a rotary encoder for detecting a vertical position of the arm 47. The rotary encoder 65 is adpated to interlock with the screw shaft 57.

Figure 3:
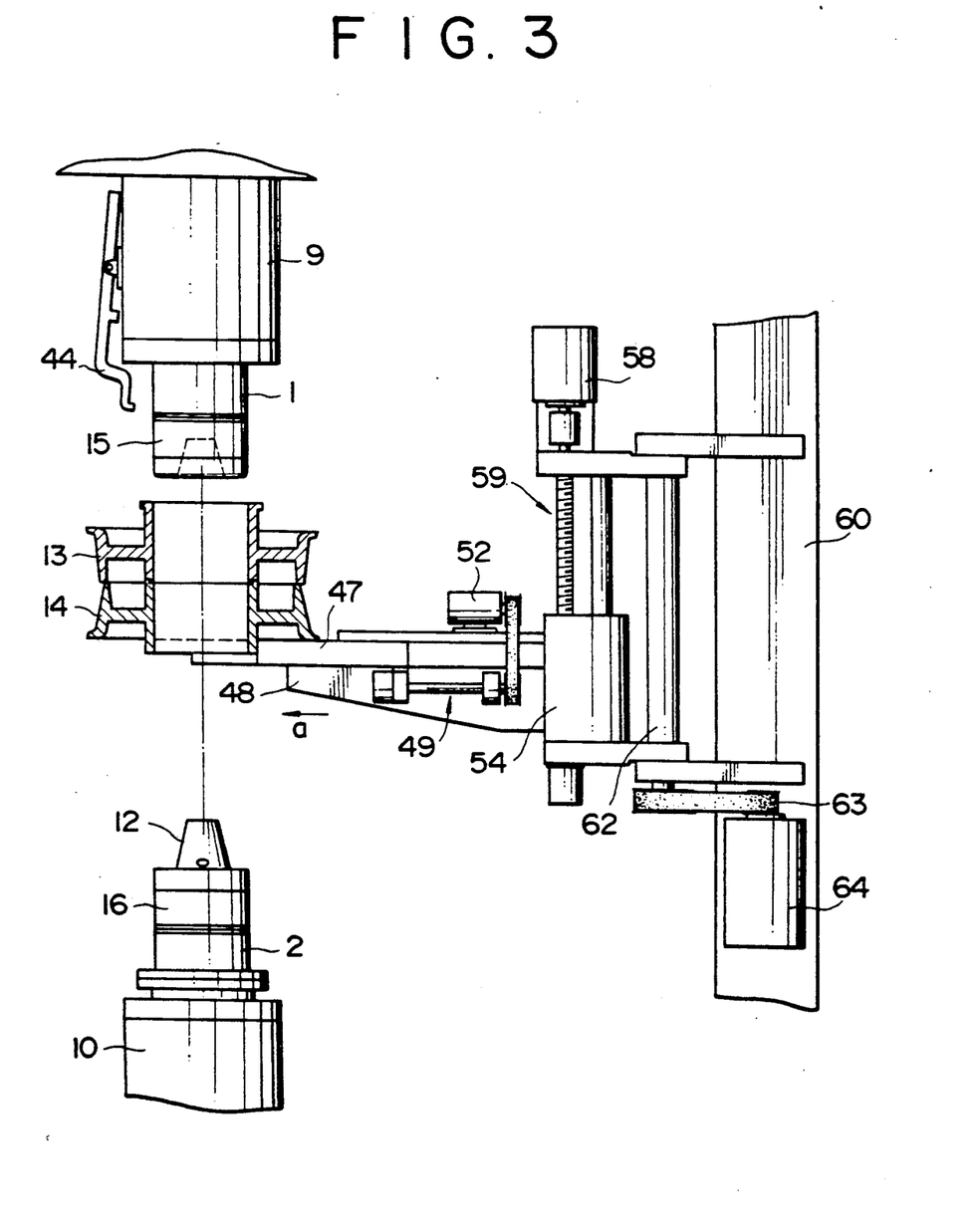
FIGS. 3 to 7 are elevated views showing the procedure of the operation according to the present invention.
Figure 4:
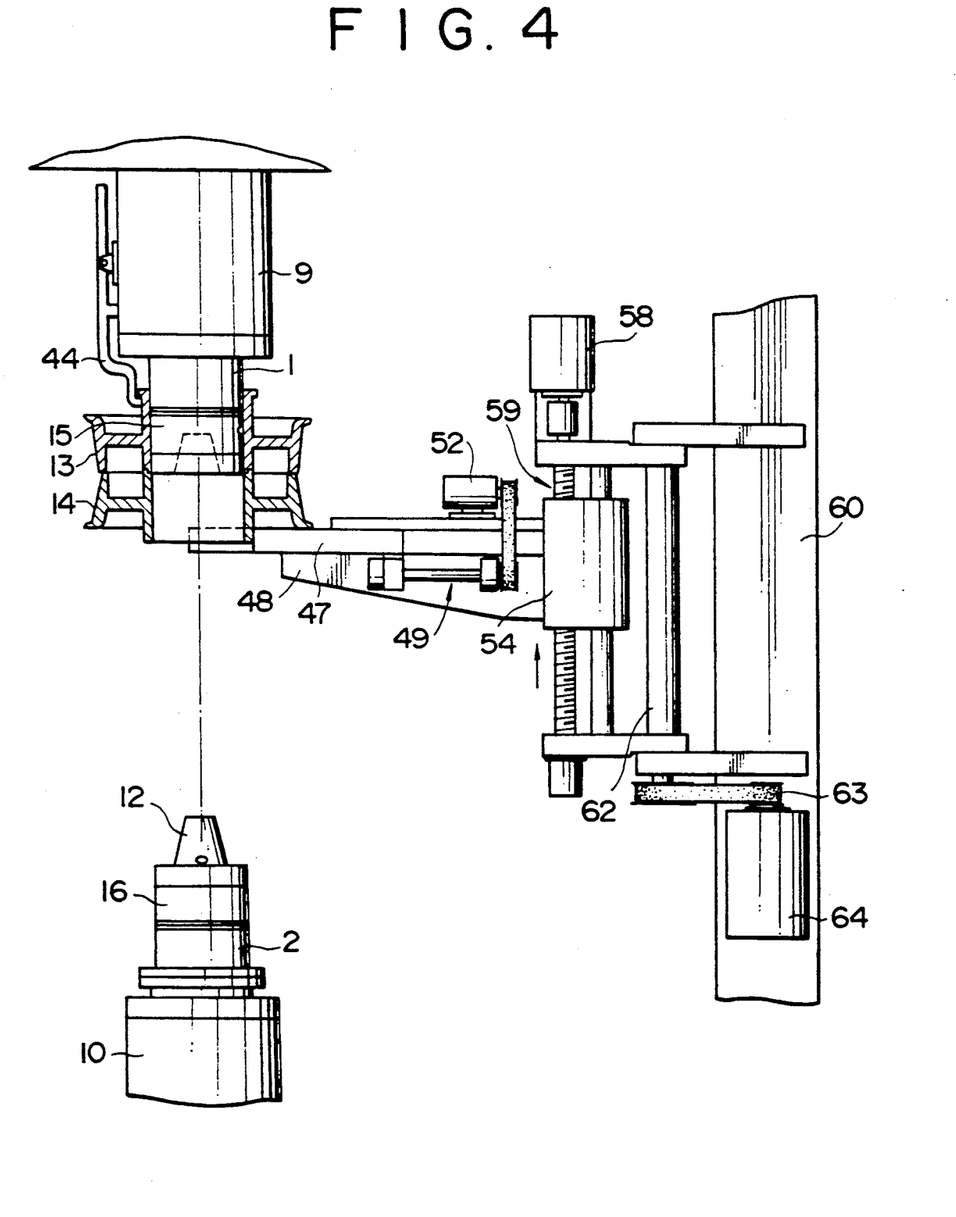
Figure 5:
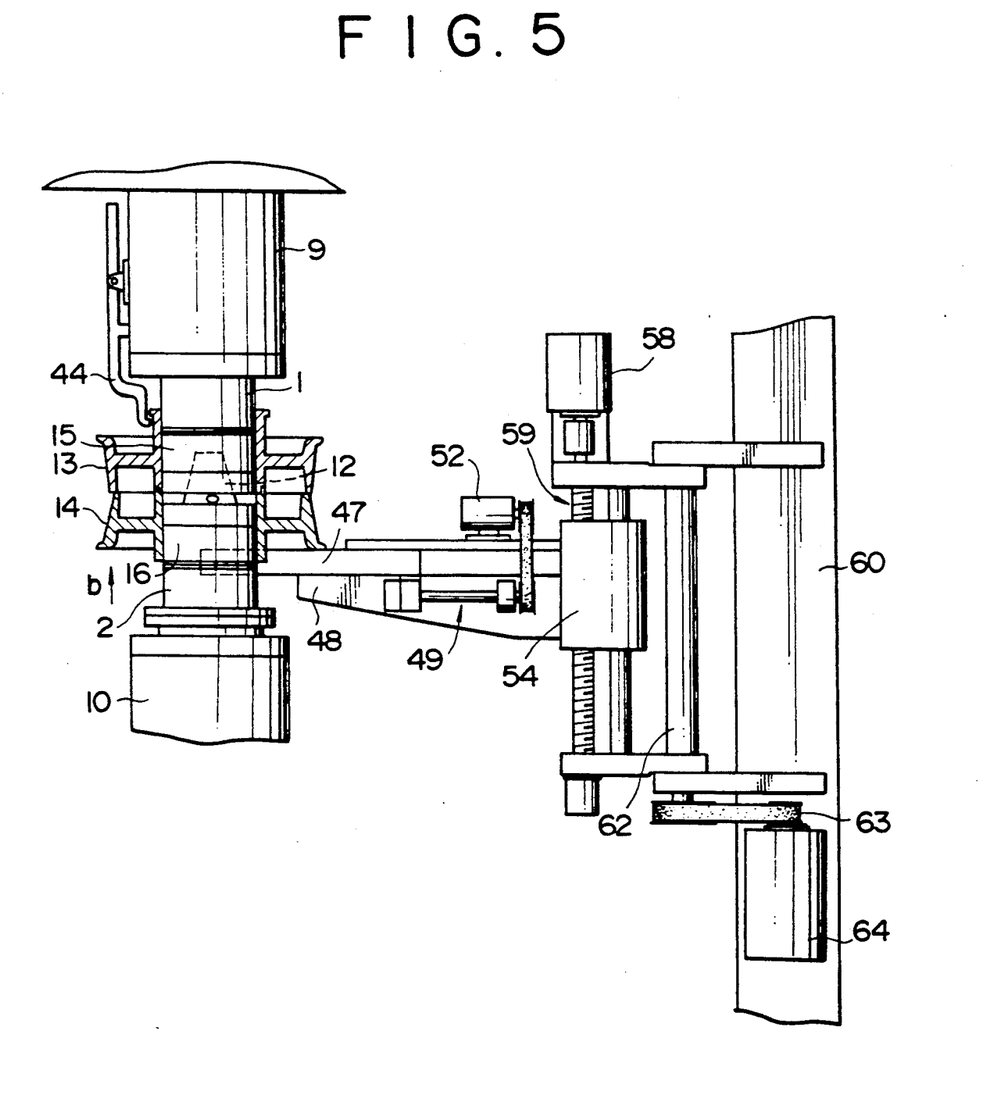

The operation of the preferred embodiment will now be described. In mounting the upper and lower rims 13 and 14 to the upper and lower spindles 1 and 2, respectively, the upper and lower rims 13 and 14 are laid on the arm 47, and the slewing frames 55 are slewed to the side of the upper and lower spindles 1 and 2 as shown in FIG. 2. Then, the arm 47 is advanced toward the upper and lower spindles 1 and 2 in a direction as depicted by an arrow a, and the upper and lower rims 13 and 14 laid on the arm 47 are aligned to the upper and lower spindles 1 and 2 as shown in FIG. 3. Then, the arm 47 is lifted so that the upper rim 13 reaches a predetermined reference position on the upper spindle 1 as shown in FIG. 4. Under the condition, the upper rim 13 is engaged with the upper spindle 1. Then, the expandable ring 19 of the upper locking means 15 is expanded to thereby lock the upper rim 13 to the upper spindle 1. Then, the lower spindle 2 is lifted in a direction as depicted by an arrow b as shown in FIG. 5 until the tapering projection 12 of the lower spindle 2 comes into engagement with the tapering recess 11 of the upper spindle 1, so that both the upper and lower spindles 1 and 2 are connected together so as to be integrally rotated about the same axis. Under the condition shown in FIG. 5, the lower spindle 2 is engaged with the lower rim 14 laid on the arm 47. Then, the arm 47 is lowered in a direction as depicted by an arrow c in FIG. 6 until the lower rim 14 reaches a predetermined reference position on the lower spindle 2. Then, the expandable ring 20 of the lower locking means 16 is expanded to thereby lock the lower rim 14 to the lower spindle 2. Thus, both the upper and lower rims 13 and 14 are fixedly positioned with a predetermined distance L therebetween set. In other words, the upper and lower rims 13 and 14 are fixed to the upper and lower spindles 1 and 2, respectively, at the predetermined reference positions on the upper and lower spindles 1 and 2 vertically spaced from a midpoint therebetween by a distance of L/2. Then, the arm 47 is lowered, and is retracted away from the upper and lower spindles 1 and 2 in a direction as depicted by an arrow d in FIG. 7. Then, the slewing frames 55 are slewed about the slewing shaft 62 to restore an original position.

In removing the upper and lower rims 13 and 14 from the upper and lower spindles 1 and 2, the above operation is similarly carried out in the reverse order.

Figure 6:
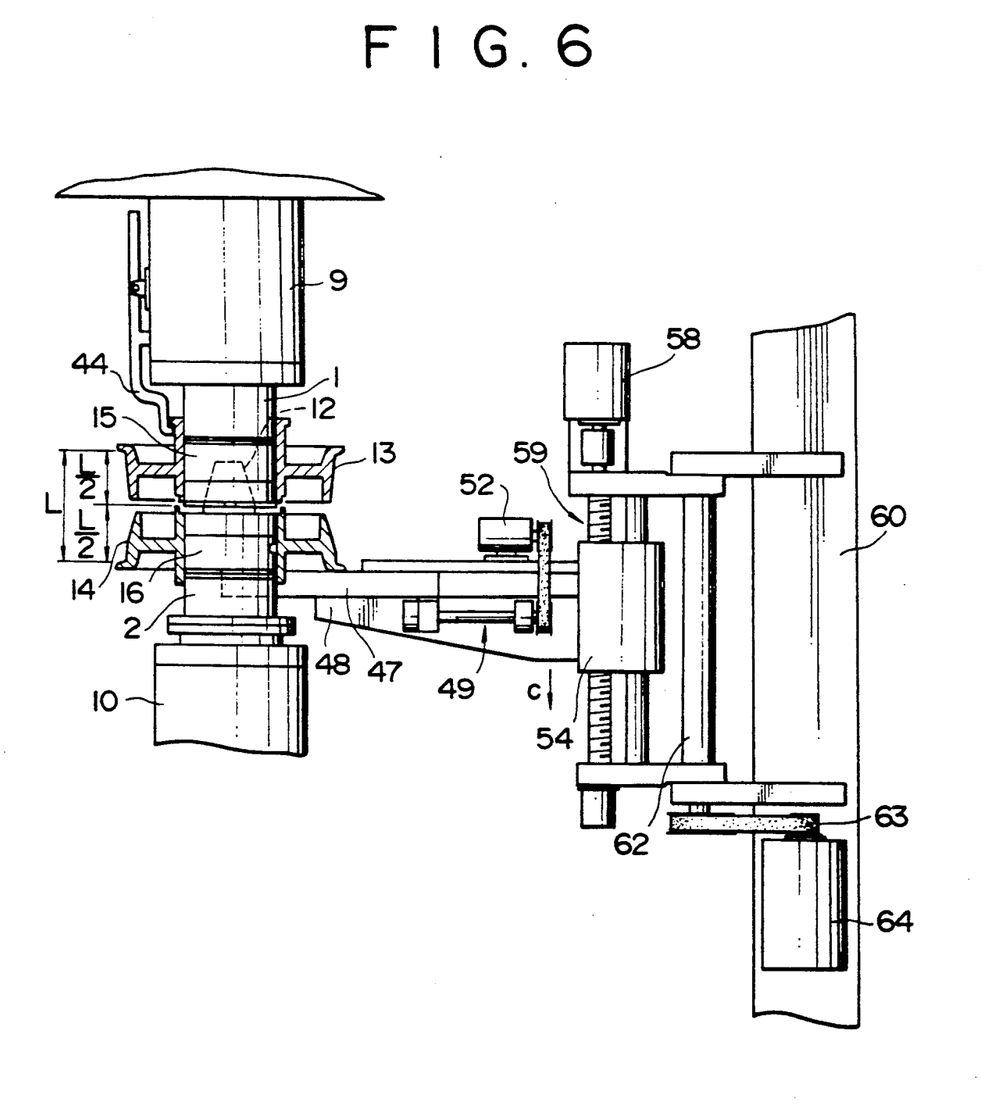
Figure 7:
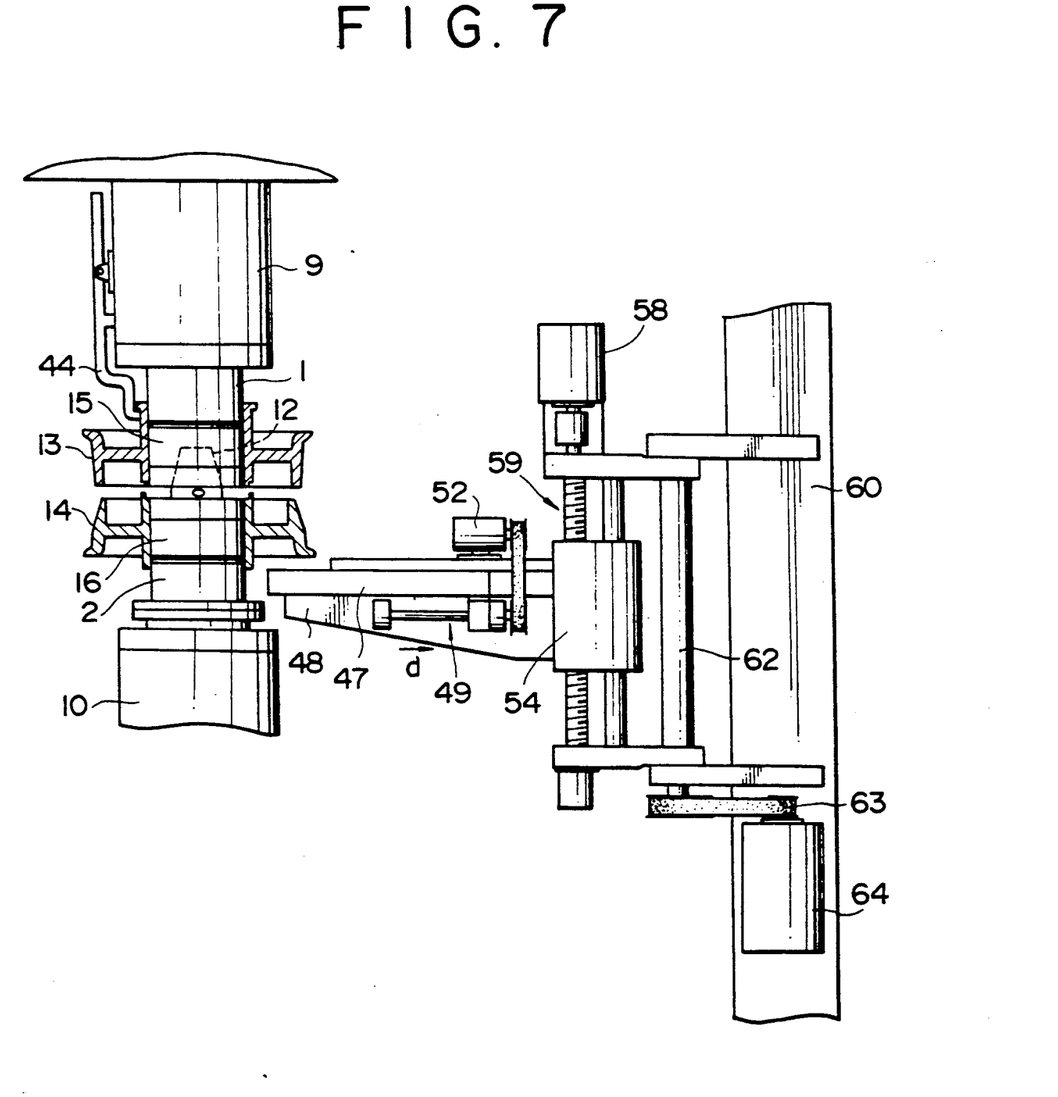

In changing the distance L between the upper and lower rims 13 and 14 without exchanging the rims, the arm 47 is slewed, lifted and advanced to the position shown in FIG. 6. Then, the locked condition of the lower rim 14 by the lower locking means 16 is released to lay the lower rim 14 on the arm 47. Then, the arm 47 is slightly lifted to the position shown in FIG. 5. Under the condition, the locked condition of the upper rim 13 by the upper locking means 15 is released to lay the upper rim 13 on the lower rim 14 laid on the arm 47. Thereafter, the same operation as above described with reference to FIGS. 5 to 7 is carried out to fix the upper and lower rims 13 ad 14 to the upper and lower spindles 1 and 2 so that another distance between the upper and lower rims 13 and 14 may be set. In this manner, the distance L can be set easily and quickly in a simple operation in comparison with the prior art employing a spacer or the like, thereby remarkably improving the operability. Furthermore, the distance L can be set to an arbitrary distance.

The upper and lower rims 13 and 14 may be a multi-stage type rim.

While the invention has been descried with reference to specific embodiments, the description is illustrative and is not to be construed as limiting the scope of the invention. Various modifications and changes may occur to those skilled in the art without departing from the spririt and scope of the invention a defined by the appended claims.

What is claimed is:

1. In a tire uniformity machine including upper and lower spindles between which a tire is mounted through upper and lower rims; a method of setting a distance between said upper and lower rims, comprising the steps of laying said upper and lower rims under a superposed condition on an arm, lifting or lowering said arm until said upper rim reaches a desired upper position on said upper spindle, fixing said upper rim from an inner circumference thereof to said upper spindle at said desired upper position by upper locking means, lowering said arm until said lower rim reaches a desired lower position on said lower spindle, and fixing said lower rim from an inner circumference thereof to said lower spindle at said desired lower position by lower locking means.

2. In a tire uniformity machine including upper and lower spindles between which a tire is mounted through upper and lower rims; a device for setting a distance between said upper and lower rims, comprising upper and lower locking means for locking said upper and lower rims from inner circumferences thereof to said upper and lower spindles at upper and lower arbitrary positions, respectively, an arm for supporting said upper and lower rims under a superposed condition, said arm being adapted to be advanced toward and retracted away from said upper and lower spindles and also adapted to be lifted and lowered in parallel to axes of said upper and lower spindles, a driving mechanism for advancing and retracting said arm, and a lifting mechanism for lifting and lowering said arm.

* * * * *